Dec. 17, 1929.  W. C. ARSEM  1,740,139
APPARATUS FOR THE PRODUCTION OF CARBON MONOXIDE
Filed May 6, 1925
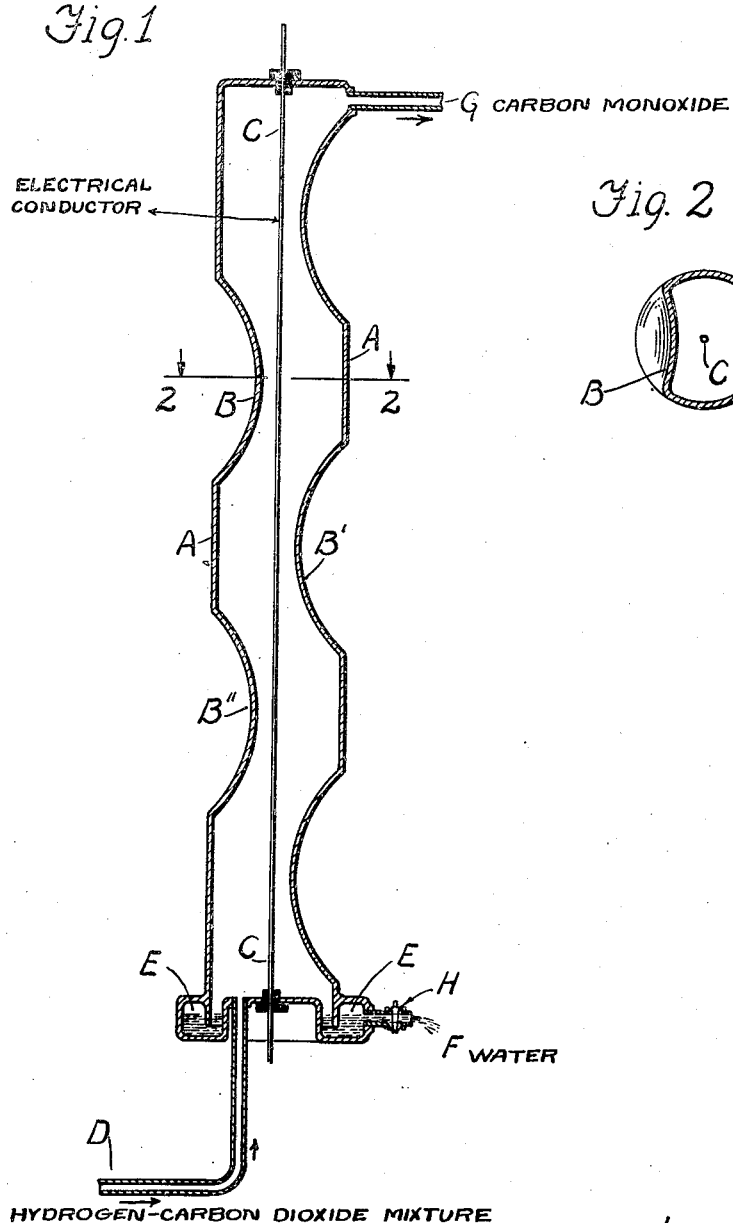

Patented Dec. 17, 1929

1,740,139

UNITED STATES PATENT OFFICE

WILLIAM C. ARSEM, OF SCHENECTADY, NEW YORK, ASSIGNOR TO COMMERCIAL SOLVENTS CORPORATION, OF TERRE HAUTE, INDIANA, A CORPORATION OF MARYLAND

APPARATUS FOR THE PRODUCTION OF CARBON MONOXIDE

Application filed May 6, 1925. Serial No. 28,350.

This invention relates to the production of carbon monoxide from mixtures of carbon dioxide and hydrogen, and pertains more specifically to an apparatus for the production of carbon monoxide from the mixture of gases evolved during the butyl-acetonic fermentation of carbohydrates.

In the manufacture of butyl alcohol and acetone by the fermentation of carbohydrate materials there is evolved a gas containing approximately 45% of hydrogen and 55% of carbon dioxide, both by volume. Small amounts of butyl alcohol, ethyl alcohol, and acetone may also be present in the gaseous mixture due to entrainment of the solvents during gas evolution from the fermenting mash.

The principal object of my invention is to provide an apparatus for the production of carbon monoxide in pure form from various gas mixtures of hydrogen and carbon dioxide, particularly from butyl fermentation gases. Other objects of my invention will become apparent.

While fermenter gases—per se—or other gaseous mixtures may be employed in my apparatus, in the case of fermenter gases it is advisable, for the sake of economy, to first remove the volatile solvents. These solvent vapors may be readily removed from the gaseous mixture by passing the gases through suitable "scrubbing towers" or "absorbing towers" such as are well known and much used in the art.

To produce pure carbon monoxide from fermenter gases in accordance with my invention and apparatus, it is necessary to adjust the relative quantities of carbon dioxide and hydrogen in the fermenter gas so that the two substances are present in molecular proportions and may combine according to the following chemical equation:

$$CO_2 + H_2 \;\; CO + H_2O.$$ 

without a residuum or excess of either of the gases.

The correct molecular relationship for the production of carbon monoxide from carbon dioxide and hydrogen is in the ratio of twenty-two pounds of carbon dioxide to one pound of hydrogen, whereas, fermenter gas, per se, contains about twenty-six pounds of carbon dioxide for each pound of hydrogen. Accordingly, if pure carbon monoxide is to be prepared from the mixture, without leaving a residuum of carbon dioxide, it is necessary to remove some carbon dioxide from the fermenter gas before the reaction occurs.

The gaseous mixture may, in any event, be readily adjusted to the proper ratio of carbon dioxide and hydrogen by passing the gaseous mixture through, or in contact with, a caustic solution which will selectively absorb carbon dioxide and thus reduce the percentage of that substance in the gaseous mixture. Or, alternatively, the gas mixture may be passed through pure water at elevated pressures which will dissolve the excess carbon dioxide and may also serve to absorb solvent vapors at the same time.

The absorbing reaction may be readily controlled by chemical means and may be adjusted so that the evolving gas mixture contains the desired ratio of carbon dioxide and hydrogen.

Fermenter gas, in its original state, or modified in its carbon dioxide content so as to secure an exact ratio of carbon dioxide and hydrogen, is suitable for employment in my apparatus for the production of carbon monoxide.

In accordance with my invention and apparatus, the gaseous mixture is passed into a converter wherein the gas is locally heated to certain temperatures at which the carbon dioxide and hydrogen react to form water and carbon monoxide in accordance with the following equation:—

$$CO_2 + H_2 \rightleftarrows CO + H_2O.$$

The equilibrium constant for this reaction is expressed by the equation:

$$K = \frac{(H_2O)(CO)}{(CO_2)(H_2)},$$

The value of K increases with the temperature, so that the percentage of carbon monoxide formed in the mixture becomes greater as the temperature rises. At 1000° C.

$K = 0.234$ and the gas mixture contains about 16.3% of carbon monoxide.

While a temperature higher than 1000° C. will produce a gas mixture which, at equilibrium, will contain more than 16.3% of carbon monoxide, I prefer to employ temperatures of the range 1000–1200° C. and to enrich the gas mixture with carbon monoxide by disturbing the equilibrium of the reversible reaction hitherto indicated.

This equilibrium may be disturbed by removing the water vapor as fast as it is formed in the reaction. As the water is removed, the reaction equilibrium is disturbed and more and more carbon monoxide is formed.

In accordance with my improved process and apparatus, a gaseous mixture of carbon dioxide and hydrogen is passed through a suitable apparatus, a simple form of which is diagrammatically represented in the accompanying drawings.

Referring to Fig. 1, the drawing shows a vertical cross section of a suitable converter for the production of carbon monoxide, while Fig. 2 shows a horizontal cross section of the same device. A represents the tubular wall or shell of the converter which departs from true cylindrical shape on account of the baffles indicated at B, B′ etc. The converter shell may be constructed of any suitable material such as glass or metal, but is preferably constructed of a material capable of rapid heat transfer, as it must be maintained at a temperature below 100° C. either by natural or by forced cooling.

Suspended inside the converter by two insulated supports is the heating element of the converter indicated at C which, in this case, is a tungsten wire, and which, during operation, is raised to incandescent heat by the passage of an electric current from an outside source.

In operating my invention, the gaseous mixture of carbon dioxide and hydrogen is forced upward into the apparatus through the entrance port indicated at D. As the gas rises in the tube portions of it come in contact with the heating element and are raised in temperature to about 1000–1200° C. whereupon the aforementioned reaction occurs and some carbon monoxide and water are formed.

As the gas mixture continues to rise up the apparatus the swirling motion produced by the presence of the baffles in the converter causes the water vapor formed in the reaction to contact therewith, whereupon it is condensed and flows as a liquid film down the inner walls of the converter. As the film of water reaches the bottom of the converter it runs into the combined trough and water seal indicated at E. This trough serves not only to remove the formed water at overflow F, but also acts as a water seal to prevent air from entering the apparatus.

The gaseous mixture continues to rise in the apparatus and is ejected through the exit port G.

The tungsten wire —C— not only acts as a heating element, but the incandescent tungsten also serves to catalytically promote the reaction.

To increase the velocity of the reaction and to enlarge the yield of carbon monoxide, I may prefer to constitute or coat the heating elements with catalytic substances. For such purpose I prefer to use iron, nickel, and cobalt or mixtures thereof, or mixtures of their oxides and carbonates as coating materials for the heating elements, whereby the velocity of the reaction may be increased and the yield per unit time of operation correspondingly enlarged.

It is obvious that the exact design of the apparatus and the exact method of operation may be widely varied without departing from the spirit of my invention.

For example, while I have described in detail but one passage of the gaseous mixture through the apparatus, it is obvious that the gaseous mixture may be recirculated through the apparatus until pure carbon monoxide is obtained. Likewise the flow of gas may be reversed—i. e.—it may enter through G and depart through D. If desirable, the entire reaction may be carried out at elevated pressures. The water seal indicated at E will not interfere with the use of elevated pressures in the apparatus, as the valve at H may be adjusted so that the level of water in the water seal E is maintained constant.

The precise number of heating elements and the arrangement thereof depends on the size and design of the apparatus. The shell A may be jacketed on the outside to permit a rapid and contant cooling action to maintain the walls at a temperature below 100° C. when at atmospheric pressure or below the boiling point of water at any specified elevated pressure.

Now, having fully described my invention, I claim the following as new and novel:—

1. In an apparatus for the production of carbon monoxide, a converter shell defining a reaction chamber the internal walls of which shell provide water-vapor condensing surfaces, entrance and exit ports to said converter, a heating element positioned within said reaction chamber and series of baffles adapted to cause the gas passing through the reaction chamber to alternately contact with the condensing surfaces and with the heating element.

2. In an apparatus for the production of carbon monoxide, a converter shell defining a reaction chamber, the internal walls of which shell provide water-vapor condensing surfaces entrance and exit ports to said converter, an electric heating element positioned within said reaction chamber, and a series of baffles adapted to cause the gas passing thru the reaction chamber to alternately contact with the condensing surfaces and with the heating element.

3. In an apparatus for the production of carbon monoxide, a converter shell defining a reaction chamber, the internal walls of which shell provide water-vapor condensing surfaces, entrance and exit ports to said converter, a heating element containing a catalyst for the production of carbon monoxide positioned within said reaction chamber, and a series of baffles adapted to cause the gas passing thru the reaction chamber to alternately contact with the condensing surfaces and with the heating element.

4. In an apparatus for the production of carbon monoxide, a converter shell defining a reaction chamber, the internal walls of which shell provide water-vapor condensing surfaces, entrance and exit ports to said converter, a tungsten wire heating element positioned within said reaction chamber, and a series of baffles adapted to cause the gas passing thru the reaction chamber to alternately contact with the condensing surfaces and with the heating element.

5. In an apparatus for the production of carbon monoxide, a converter shell defining a reaction chamber, the internal walls of which shell provide water-vapor condensing surfaces, entrance and exit ports to said converter, a heating element of suitable character to give temperatures of 1000–1200° C. positioned within said reaction chamber, and a series of baffles adapted to cause the gas passing thru the reaction chamber to alternately contact with the condensing surfaces and with the heating element.

6. In an apparatus for the production of carbon monoxide, a converter shell of a material capable of rapid heat transfer, the internal walls of which shell provide water-vapor condensing surfaces, a heating element positioned within said reaction chamber, and a series of baffles adapted to cause the gas passing thru the reaction chamber to alternately contact with the condensing surfaces and with the heating element.

7. In an apparatus for the production of carbon monoxide, a tubular converter shell of a material capable of rapid heat transfer, the internal walls of which shell provide water-vapor condensing surfaces, a heating element positioned within said reaction chamber, and a series of baffles adapted to cause the gas passing thru the reaction chamber to alternately contact with the condensing surfaces and with the heating element.

In testimony whereof I affix my signature.

WILLIAM C. ARSEM.